(12) United States Patent
Fisher et al.

(10) Patent No.: US 7,424,003 B2
(45) Date of Patent: Sep. 9, 2008

(54) MULTI-PARAMETER SCHEDULING IN COMMUNICATION SYSTEMS

(75) Inventors: Abraham Fisher, Haifa (IL); Gil Graiber, Kfar-Vradim (IL)

(73) Assignee: Surf Communication Solutions (IL)

( * ) Notice: Subject to any disclaimer, the term of this patent is extended or adjusted under 35 U.S.C. 154(b) by 835 days.

(21) Appl. No.: 10/796,511

(22) Filed: Mar. 8, 2004

(65) Prior Publication Data

US 2005/0195826 A1 Sep. 8, 2005

(51) Int. Cl.
*H04B 7/212* (2006.01)

(52) U.S. Cl. ............... 370/348; 370/458; 370/236; 370/252

(58) Field of Classification Search ......... 370/229, 370/230, 321, 322, 326, 329, 337, 347, 431, 370/433, 442, 458, 235, 328, 348; 455/502; 709/229, 200, 234
See application file for complete search history.

(56) References Cited

U.S. PATENT DOCUMENTS

| | | | |
|---|---|---|---|
| 4,965,641 A | 10/1990 | Blackwell et al. | |
| 5,099,449 A | 3/1992 | Dombrosky et al. | |
| 5,166,930 A | 11/1992 | Braff et al. | |
| 5,386,517 A | 1/1995 | Sheth et al. | |
| 5,491,691 A | 2/1996 | Shtayer et al. | |
| 5,546,388 A | 8/1996 | Lin | |
| 5,563,885 A * | 10/1996 | Witchey | 370/391 |
| 5,568,402 A | 10/1996 | Gray et al. | |
| 5,590,345 A | 12/1996 | Barker et al. | |
| 5,664,095 A | 9/1997 | Cox et al. | |
| 5,712,851 A | 1/1998 | Nguyen et al. | |
| 5,721,830 A | 2/1998 | Yeh et al. | |
| 5,745,758 A | 4/1998 | Shaw et al. | |
| 5,748,629 A | 5/1998 | Caldara et al. | |
| 5,751,708 A | 5/1998 | Eng et al. | |
| 5,774,668 A | 6/1998 | Choquier et al. | |

(Continued)

FOREIGN PATENT DOCUMENTS

EP 0 491 489 6/1992

(Continued)

OTHER PUBLICATIONS

Crovella, M. E. et al. for Usenix; Abstracts "Connection Scheduling in Web Servers;" last changed Sep. 23, 1999; 1 page retrieved from the internet on Jan. 30, 2002 <http://www.usenix.org./events/usits99/crovella.html>.

(Continued)

*Primary Examiner*—Ricky Ngo
*Assistant Examiner*—Wei-Po Kao
(74) *Attorney, Agent, or Firm*—Factor Patent Attorney; Yaakov Schatz (57) ABSTRACT

A method of scheduling the handling of communication channels by a processor assigned to handle a plurality of channels. The method includes determining for each channel, handled by the processor, a target time by which time it should receive processing, selecting one or more of the assigned channels whose data is to be handled next, based on the target times of the channels and when more than one channel is selected, choosing for handling before other channels, at least one of the selected channels based on a consideration directed at minimizing the average processing time of the channels.

31 Claims, 3 Drawing Sheets

U.S. PATENT DOCUMENTS

| | | | |
|---|---|---|---|
| 5,790,781 A | 8/1998 | Cox et al. | |
| 5,790,887 A | 8/1998 | Brech | |
| 5,794,058 A | 8/1998 | Resnick | |
| 5,799,064 A | 8/1998 | Sridhar et al. | |
| 5,805,827 A | 9/1998 | Chau et al. | |
| 5,832,262 A | 11/1998 | Johnson et al. | |
| 5,852,655 A | 12/1998 | McHale et al. | |
| 5,905,725 A | 5/1999 | Sindhu et al. | |
| 5,909,384 A | 6/1999 | Tal et al. | |
| 5,917,824 A | 6/1999 | Brueckheimer et al. | |
| 5,920,599 A | 7/1999 | Igarashi | |
| 5,925,114 A | 7/1999 | Hoang | |
| 5,931,950 A | 8/1999 | Hsu et al. | |
| 5,935,249 A | 8/1999 | Stern et al. | |
| 5,940,459 A | 8/1999 | Hsu et al. | |
| 5,960,035 A | 9/1999 | Sridhar et al. | |
| 5,982,776 A | 11/1999 | Manning et al. | |
| 5,982,814 A | 11/1999 | Yeh et al. | |
| 5,987,031 A | 11/1999 | Miller et al. | |
| 5,995,540 A | 11/1999 | Draganic | |
| 6,006,318 A | 12/1999 | Hansen et al. | |
| 6,058,114 A | 5/2000 | Sethuram et al. | |
| 6,084,919 A | 7/2000 | Kleider et al. | |
| 6,115,360 A | 9/2000 | Quay et al. | |
| 6,128,749 A | 10/2000 | McDonnell et al. | |
| 6,148,006 A | 11/2000 | Dyke et al. | |
| 6,157,963 A | 12/2000 | Courtright et al. | |
| 6,160,843 A | 12/2000 | McHale et al. | |
| 6,163,599 A | 12/2000 | McHale | |
| 6,185,698 B1 | 2/2001 | Wesley et al. | |
| 6,195,699 B1 * | 2/2001 | Dennis | 709/229 |
| 6,226,277 B1 | 5/2001 | Chuah | |
| 6,262,986 B1 | 7/2001 | Ora et al. | |
| 6,353,616 B1 | 3/2002 | Elwalid et al. | |
| 6,385,638 B1 | 5/2002 | Baker-Harvey | |
| 6,385,673 B1 | 5/2002 | DeMoney | |
| 6,457,037 B1 | 9/2002 | Maytal | |
| 6,466,976 B1 | 10/2002 | Alles et al. | |
| 6,490,298 B1 * | 12/2002 | Chin et al. | 370/532 |
| 6,502,062 B1 * | 12/2002 | Acharya et al. | 702/186 |
| 6,549,951 B1 | 4/2003 | Huld et al. | |
| 6,553,376 B1 | 4/2003 | Lewis et al. | |
| 6,577,871 B1 | 6/2003 | Budka et al. | |
| 6,603,745 B1 | 8/2003 | Antonio et al. | |
| 6,614,794 B1 | 9/2003 | Adas et al. | |
| 2003/0014484 A1 * | 1/2003 | Netzer et al. | 709/203 |
| 2004/0172476 A1 * | 9/2004 | Chapweske | 709/231 |
| 2004/0218545 A1 * | 11/2004 | Pedersen | 370/252 |
| 2005/0043045 A1 * | 2/2005 | Cheng et al. | 455/502 |

FOREIGN PATENT DOCUMENTS

| | | |
|---|---|---|
| EP | 0 831 624 | 3/1998 |
| EP | 0 859 492 | 8/1998 |
| EP | 0 913 770 | 5/1999 |
| WO | WO 98/54868 | 12/1998 |
| WO | WO 99/06913 | 2/1999 |
| WO | WO 99/20033 | 4/1999 |
| WO | WO 99/39530 | 8/1999 |
| WO | WO 00/11843 | 3/2000 |
| WO | WO 01/35228 | 5/2001 |
| WO | WO 01/35575 | 5/2001 |
| WO | WO 01/60008 | 8/2001 |

OTHER PUBLICATIONS

Eyuboglu, M. V. et al.; "Advanced Modulation Techniques for V.Fast;" May-Jun. 1993; pp. 243-256; European Trans. On Telecomm. and Related Tech.; vol. 4; No. 3.

Forney, D. G. Jr. et al.; "The V.34 High-Speed Modem Standard;" Dec. 1996; pp. 28-33; IEEE Communications Magazine.

Gieseler, S.; Tunnelbau. Remote-Access-Server als Basis für Virtual Private Networks; Net—Zeitschrift Fuer Kommunikationsmanagement, Huthig Verlag; vol. 52; No. 8/9; 1998; pp. 38-40; XP000782761.

Gopalakrishnan, R. et al.; "Efficient User-Space Protocol Implementations with QoS Guarantees Using Real-Time Upcalls;" Aug. 1, 1998; pp. 374-388; IEEE/ACM Transactions on Networking; vol. 6; No. 4; XP000771968.

Held, G.; "The Complete Modem Reference;" John Wiley and Sons; pp. 260-262; XP002153737.

ITU-T Telecommunication Standardization Sector of ITU; "Series V: Data Communication Over the Telephone Network—Interfaces and Voiceband Modems;" "A Modem Operating at Data Signalling Rates of up to 33 600 Bits/s for Use on the General Switched Telephone Network and on Leased Point-to-Point 2-Wire Telephone-Type Circuits;" Oct. 9, 1996; International Telecommunication Union; ITU-T Recommendation V.34, XP002082229.

Macvittie, D. for Sun.com; "Best Practices How-Tos: Tuning your iPlanet[tm] Web Server"; Nov. 19, 2001; pp. 1-7; retrieved from the internet on Jan. 24, 2002 <http://dcb.sun.com/practices/howtos/tuning_iplanet.jsp>.

Newtons's Telecom Dictionary, the Official Dictionary of Telecommunications & the Internet; 15th Updated, Expanded and Much Improved Edition; Feb. 1999; pp. 645, 660; "RAC—Remote Access Concentrator" and "Remote Access Server".

Zeus Technology Inc.; Zeus Load Balancer v1.4; Chapter 1—Sizing Guide; retrieved from the internet on Jan. 24, 2002 <http://support.zeus.com/doc/zlb/sizing-guide.pdf>.

"T.38"; ITU-T Telecommunication Standardization Sector of ITU; Jun. 18, 1998; XP002163782.

Keshev S: "An Engineering Approach to Computer Networking" 1997, Addison-Wesley, Reading, Massachusetts, USA, XP000863911 ISBN: 0201634422.

* cited by examiner

MULTI-PARAMETER SCHEDULING IN COMMUNICATION SYSTEMS

FIELD OF THE INVENTION

The present invention relates to communication systems and in particular to systems for handling remote access connections.

BACKGROUND OF THE INVENTION

Many providers of communication services employ one or more communication servers, such as remote access servers, access routers, and voice over IP gateways. The communication servers may act as modems, fax handlers, voice over Internet Protocol (VoIP) servers and/or may provide any other communication services for a plurality of channels (referred to also as connections).

In these communication servers, the data of each channel is accumulated by an input driver, which provides, at predetermined periods, blocks of data to a digital signal processor (DSP), for processing. A predetermined time after the data blocks are provided by the input driver, an output driver retrieves the processed data. Therefore, the signal processor must handle the data of each channel between the time the data is provided by the input driver and the time the data is retrieved by the output driver. The time within which the processing must be performed is referred to as the cycle time of the channel.

In some cases, the processor may not complete the handling of one or more channels during their cycles. In such cases, old data may remain in the output buffer at the beginning of the next cycle. Generally, there is no mechanism that prevents the output driver from retrieving the old data, except the timing of the processor and the output driver. That is, if the processor requires time beyond the end of a cycle in order to finish the handling of one or more channels the output driver is not delayed but takes the data from the output buffer as usual, including old data. A state in which data of a channel is not handled during one of its cycles is referred to as a starvation state. A channel which reaches a starvation state suffers from a degradation of service and may be disconnected.

Different connections have different cycle times. For example, the ITU standard G723.1 connection requires handling of its data with a cycle of 30 milliseconds while the ITU standard G729A connection requires handling of its data with a 10 millisecond cycle. Some connections, e.g., modem and fax connections, may operate over a large range of data rates and cycle times.

Some communication servers utilize a processor, which operates as a multi-channel server serving a plurality of channels. Such a multi-channel server generally includes a scheduler that determines which channel is handled by the processor at any specific time. If an operating system that performs preemption is used, the scheduling of the processor to handle data from connections with different cycles may be less strict as the processor may interrupt the processing of data from one channel to handle data from another channel. Preemption, however, may require large percentages of the resources of the processor and therefore is wasteful.

PCT Publication No. WO 01/60008, titled "Scheduling in a Remote Access Server", the disclosure of which is incorporated herein by reference, describes methods of scheduling a processor, which does not perform preemption, to handle channels having different cycle rates. In one embodiment, a scheduler determines a deadline for each channel by which the channel must receive a processing session. A channel having the closest deadline is scheduled for handling. Various methods are suggested for use, when a plurality of channels have same deadlines. In one option, a channel with a higher quality of service rating is handled first. In another option, an arbitrary order is used. In still another option, the order in a current cycle is determined based on the order in previous handling cycles.

An additional scheduler for communication systems is described in U.S. Pat. No. 6,385,638 to Baker-Harvey, the disclosure of which is incorporated herein by reference. An industrial controller is described in U.S. Pat. No. 5,099,449 to Dombrosky et al., the disclosure of which is incorporated herein by reference.

SUMMARY OF THE INVENTION

An aspect of some embodiments of the present invention relates to a scheduler of a communication server which determines the order in which channels are handled based on efficiency considerations in addition to timing issues. The scheduler operates in a communication server which handles connections that need to receive handling based on time constraints, for example, once during each cycle of their cycle scheme. The scheduler of the communication server determines the channel-handling order based on timing issues, which are directed to ensuring timely handling, and also based on efficiency considerations directed at maximizing the number of channels the processor can handle. The maximization of the number of handled channels is optionally achieved by reducing the amount of time spent on data transfer of software run by the processor.

Optionally, when not required otherwise by timing issues, connections of the same type are handled consecutively, so that the time required for changing the software in the memory of the processor is minimized.

In some embodiments of the invention, the efficiency considerations are taken into account only for channels having equal handling priority based on timing considerations. Alternatively, efficiency considerations are taken into account whenever they do not cause a channel not to receive handling on time or cause starvation. For example, if a plurality of channels requiring handling have different times until the end of their cycles, the channels will be handled according to their types, as long as the scheduling order used does not cause another channel to miss its handling time.

An aspect of some embodiments of the present invention relates to a communication server which handles connections that need to receive handling based on time constraints, for example, once during each cycle of their cycle scheme. The scheduler optionally determines a plurality of channels with different deadlines, which can be scheduled without causing starvation, and selects from the determined channels a next channel to be scheduled based on one or more considerations not related to timing issues. Thus, preference is given to non-timing considerations. The non-timing considerations may include, for example, quality of service ratings and/or processing efficiency.

In some embodiments of the invention, the scheduler determines a sub-set of channels that can be handled in any order before their cycles end. The order in which the channels in the sub-set are handled is optionally determined according to the non-timing issues.

There is therefore provided in accordance with the present invention, a method of scheduling the handling of communication channels by a processor assigned to handle a plurality of channels, comprising determining for each channel, handled by the processor, a target time by which time it should receive processing, selecting one or more of the assigned channels whose data is to be handled next, based on the target times of the channels, and when more than one channel is selected, choosing for handling before other channels, at least one of the selected channels based on a consideration directed at minimizing the average processing time of the channels.

Optionally, determining a target time for each channel comprises determining a time by which the channel needs to receive a handling session in order to avoid starvation.

Optionally, determining a target time for each channel comprises determining an average duration of the handling of the channel. Optionally, determining a target time for each channel comprises determining the target time as the time at which a driver collects processed data of the channel minus the average handling duration. Optionally, selecting based on the target times comprises selecting the channels having a shortest duration until their target times.

Optionally, selecting based on the target times comprises determining a closest target time among the target times of the channels and determining a number of channels which can be handled in the time remaining until the shortest target time. Optionally, selecting based on the target times comprises selecting channels having the shortest time until their target times up to the determined number of channels. Optionally, choosing at least one of the selected channels comprises choosing at least one channel that requires processing by a software module already in a memory of the processor. Optionally, choosing at least one of the selected channels comprises choosing at least one channel of a same type as a channel currently handled by the processor.

Optionally, choosing at least one of the selected channels comprises choosing from all the selected channels based on the consideration directed at minimizing the average processing time of the channels.

Optionally, choosing at least one of the selected channels comprises choosing from the selected channels that have an equal quality of service rating. Optionally, choosing at least one of the selected channels comprises choosing for handling all the selected channels before handling other channels. Optionally, selecting based on the target times comprises selecting a plurality of channels having different target times. Optionally, choosing at least one of the selected channels comprises choosing based on the protocol governing the handling of the data of the channels. Optionally, choosing at least one of the selected channels comprises choosing based on the transmission rates of the channels.

Optionally, choosing at least one of the selected channels comprises choosing based on the types of the channels. Optionally, choosing at least one of the selected channels comprises choosing based on a consideration that minimizes time spent on memory transfers.

There is therefore provided in accordance with the present invention, a method of scheduling the handling of communication channels by a processor assigned to handle a plurality of channels, comprising determining for each channel, handled by the processor, a target time by which time it should receive processing, selecting, based on the target times of the channels, a plurality of assigned channels, having two or more different target times, from which a next handled channel is to be selected, choosing for processing one of the selected channels at least partially based on considerations not related to the target times of the channels and scheduling the processor to handle the chosen channel.

Optionally, choosing one of the selected channels comprises choosing a channel having a farther target time than at least one channel that was not chosen. Optionally, choosing one of the selected channels comprises choosing from the selected channels a channel having a closer target time than at least one channel that was not chosen. Optionally, choosing one of the selected channels comprises selecting based on processing efficiency considerations. Optionally, determining a target time for each channel comprises determining a time by which the channel needs to receive a handling session in order to avoid starvation.

Optionally, selecting based on the target times comprises determining a number x of channels which can be handled in the time remaining until a closest target time of the assigned channels, and selecting the x channels having the shortest time until their target times. Optionally, choosing one of the selected channels comprises choosing a channel that requires processing by a software module already in a memory of the processor. Optionally, choosing one of the selected channels comprises choosing a channel of a same type as a channel currently handled by the processor. Optionally, choosing one of the selected channels comprises choosing a plurality of channels based on considerations not related to timing issues and choosing therefrom a single channel based on the target times.

There is therefore provided in accordance with the present invention, a scheduler of a processor assigned to handle a plurality of channels, comprising a memory adapted to store target time information for each of the channels, indicating a target time until which the channel should receive a processing session and a processor adapted to select one or more of the assigned channels whose data is to be handled next, based on the target times of the channels, to choose at least one of the selected channels based on a consideration directed at minimizing the average processing time of the channels, when the selecting based on the target times results in a plurality of channels and to schedule the processor to handle one of the at least one chosen channels.

Optionally, the processor may select based on the target times a plurality of channels having different target times. Optionally, the memory is also adapted to store software modules run by the processor and wherein the memory has a size which can store fewer than all the software modules required to handle the plurality of channels. Optionally, minimizing the average processing time comprises minimizing the time spent on data transfers to the memory, of software modules.

BRIEF DESCRIPTION OF FIGURES

Exemplary non-limiting embodiments of the invention will be described with reference to the following description of embodiments in conjunction with the figures. Identical structures, elements or parts which appear in more than one figure are preferably labeled with a same or similar number in all the figures in which they appear, in which.

DETAILED DESCRIPTION OF EMBODIMENTS

Figure 1:
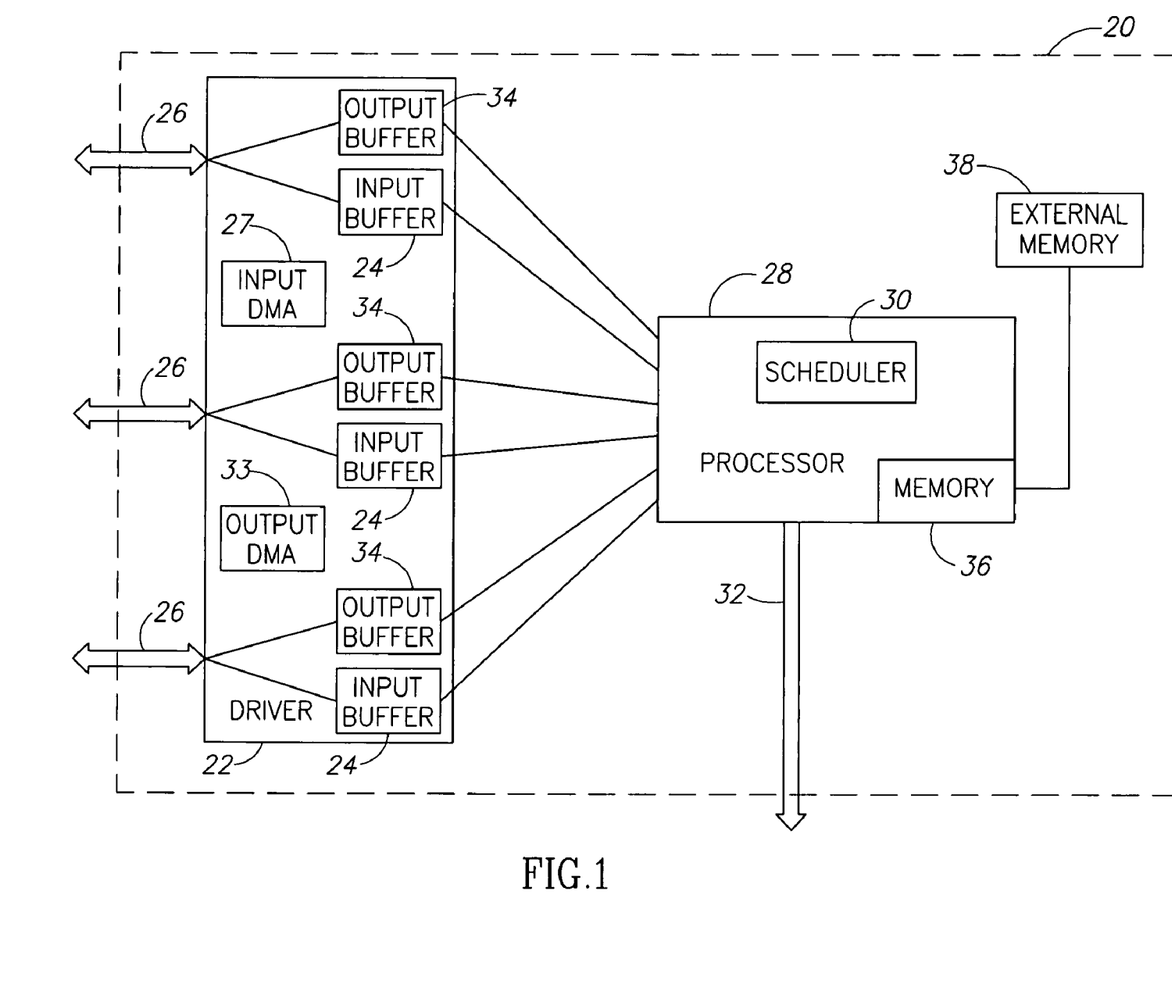
FIG. 1 is a schematic illustration of a connection handling server, in accordance with an exemplary embodiment of the present invention.

FIG. 1 is a schematic illustration of a connection handling server 20, in accordance with an exemplary embodiment of the present invention. Server 20 handles a plurality of channels 26 (referred to also as connections) from which it receives data and to which it transfers data. The data on channels 26 may comprise voice, fax, modem, video and/or any other type of communication signals. Server 20 optionally comprises a driver 22 which includes an input buffer 24 and an output buffer 34 for each channel 26. Driver 22 optionally places samples (e.g., PCM samples) from channels 26 into their respective input buffers 24 at a predetermined input rate and transfers samples from the output buffers 34 to their respective channels 26 at a predetermined output rate, optionally equal to the input rate. A processor 28 periodically retrieves data from input buffers 24, processes the data and passes the processed data on an upper layer interface line 32. In addition, processor 28 receives data from interface line 32, processes the received data and places the processed data in output buffer 34.

In some embodiments of the invention, the input and/or output rates of driver 22 are a function of the type of data passing on the respective channel 26. In some embodiments of the invention, the rates of operation of the drivers may be set by an operator of server 20. In some embodiments of the invention, driver 22 accumulates the data of all the channels at a common sampling rate. In an exemplary embodiment, the sampling rate of driver 22 is 8 kHz.

Optionally, driver 22 comprises a single hardware unit and/or a processor, which performs additional tasks of server 20, for example processor 28. Alternatively, some or all of channels 26 comprise separate hardware units which perform the tasks of driver 22 for the one or more channels. In some embodiments of the invention, driver 22 comprises an input direct memory access (DMA) 27 which transfers data into buffers 24 from their respective channels 26 and/or an output DMA 33 which transfers data from buffers 34 to their respective channels 26, for each of the channels. Alternatively, driver 22 comprises a single input and output DMA.

Server 20 may be employed as a stand alone server or may be used as part of an array of servers, of the same or different types. The array of servers is optionally used with a channel router, of any type known in the art, for example, the router described in PCT Application No. PCT/IL00/00703, filed on Nov. 1, 2000, now PCT Publication No. WO 01/35575, which is assigned to the assignee of the present application, and the disclosure of which is incorporated herein by reference.

In some embodiments of the invention, processor 28 executes, for each channel 26, a software module which handles the data of the channel. Generally, each type of channel (e.g., modem, fax, voice, video) has a different software module. Alternatively, each channel sub-type (e.g., different voice codec, different modem protocol) has a separate software module. Optionally, processor 28 includes an internal memory 36 which hosts the software module currently run by the processor. In some embodiments of the invention, internal memory 36 additionally stores one or more software modules of other channels, for example modules previously run by processor 28. It is noted, however, that in some embodiments of the invention, internal memory 36 does not have sufficient space to store all the software modules required by the channels handled concurrently by server 20. An external memory 38 optionally stores the software modules required by all the channels currently handled by server 20 or all the software modules required to handled the channels that server 20 supports. Each time a channel is to be handled by processor 28, the software module required for the handling is loaded from external memory 38 to internal memory 36, if not already in the internal memory.

Generally, the software module of each channel 26 should be executed periodically within certain time constraints in order to ensure that data overwritten in input buffer 24 was already retrieved by processor 28 and/or that data transferred from output buffer 34 to channel 26 is new data recently placed by processor 28.

For voice channels, the processing performed by processor 28 optionally includes one or more of voice codec tasks, echo cancellation, voice activity detection, in-band tone detection and generation, RTP processing, jitter buffer management and/or IP/UDP layer tasks. For modem channels the processing optionally includes data pump modulation/demodulation, error correction (EC) and/or data compression (DC). For fax channels, the processing optionally includes data pump modulation/demodulation and/or fax decoding and encoding.

In some embodiments of the invention, each channel 26 has a respective cycle, having an associated cycle time, in which it should receive a handling session from processor 28. It is noted, however, that the connection is not necessarily handled by the processor at the same time point within each cycle.

In some embodiments of the invention, at the end of the respective cycle of the channel, driver 22 begins to pass onto channel 26 the block of data from output buffer 34 prepared during the processing cycle. If the processing of the channel is not completed before the end of the cycle of the channel, the data retrieved from output buffer 34 may be old data, thus providing erroneous data onto channel 26. Optionally, output DMA 33 is set to begin retrieving the processed data a predetermined time, e.g., 0.5-5 msec, after the end of the cycle, such that a small delay in the processing does not cause an error.

Channels 26 may, under some circumstances, not be limited in their types, cycle lengths and/or the times at which their cycles begin or end. Thus, processor 28 may handle, at any specific time, a plurality of channels of different types, having different cycle times and/or having different cycle beginning and/or end times.

Optionally, buffers 24 and/or 34 comprise first-in first-out (FIFO) cyclic buffers in which new data continuously overwrites old data. In some embodiments of the invention, buffers 24 and 34 have room to accommodate data of at least two processing cycles (optionally, of four to eight processing cycles) of each channel handled by server 20. Optionally, all the buffers 24 and/or 34 have the same size. Alternatively, different buffers have different sizes according to the lengths of the processing cycles of their respective channels.

A scheduler 30, which is optionally run on processor 28, or which may be external to processor 28, sets the order in which processor 28 schedules processing sessions of the channels, and optionally the durations of the sessions. Generally, when scheduler 30 allocates a processing session to a connection, the connection utilizes an amount of processing time according to its needs. That is, in different cycles, a connection may utilize different amounts of processing time and different connections may have different average processing times.

Optionally, once scheduler 30 allocates the use of processor 28 to a channel, the scheduler does not interrupt the processing of that channel until the processing of the channel is completed. Further optionally, processor 28 does not run an operating system which performs preemption. Not running an operating system that performs preemption reduces the processing power required from processor 28 and reduces the number of times data blocks and software modules required for processing need to be moved into the internal memory of the processor.

Figure 2:
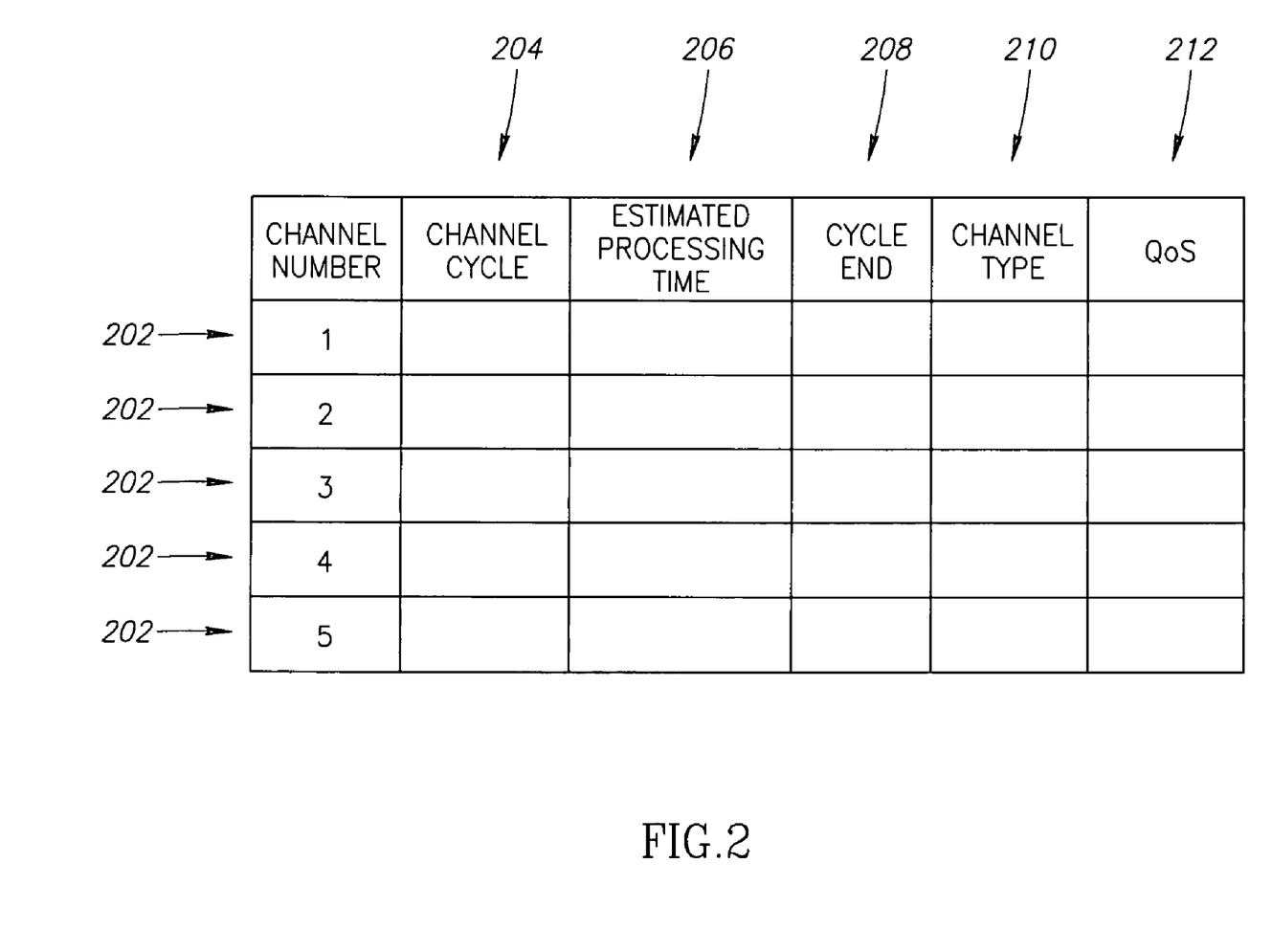
FIG. 2 is schematic illustration of a scheduler table, in accordance with an exemplary embodiment of the present invention.

FIG. 2 is a schematic illustration of a table 200 of scheduler 30, in accordance with an exemplary embodiment of the present invention. Table 200 is optionally stored in internal memory 36 of processor 28 or in a separate memory unit (not shown) of scheduler 30. For each channel handled by server 20, table 200 optionally comprises a record 202 which lists the cycle length of the channel 204, the estimated time required to handle the channel in each cycle 206 and/or the time at which the channel's next cycle ends 208. In some embodiments of the invention, the cycle of a channel ends when driver 22 is scheduled to collect processed data of the channel from output buffer 34. Alternatively, the cycle of a channel is scheduled to end a predetermined safety margin time before driver 22 is scheduled to begin collection of the processed data, so that slight delays in the processing by processor 28 do not cause transfer of erroneous data. The length of the safety margin may depend, for example, on the variance of the processing times of the sessions performed by processor 28. Alternatively or additionally to stating the time at which the next cycle of the channel ends 208, table 200 states the time at which the channel was previously handled. The time at which the channel was previously handled 208 may be stated as the time at which the processing began and/or the time at which the processing ended.

In addition to timing information, table 200 includes, for each channel, an indication 210 of the type (e.g., fax, modem) and/or sub-type (e.g., different protocols) of the channel. Alternatively or additionally, table 200 includes an indication of the software module assigned to handle the data of the channel.

In some embodiments of the invention, table 200 of scheduler 30 lists the quality of service (QoS) 210 of each channel and/or other information which can be used for secondary considerations of channel selection.

Optionally, the estimated time 206 required to handle the channel is calculated as an average or maximum of the time consumed in previous handling sessions of the channel. Alternatively or additionally, the estimated required time is calculated as a function of one or more attributes of the channel, e.g., the type of data it caries (modem, fax, voice) or the sub-type of the channel.

Figure 3:
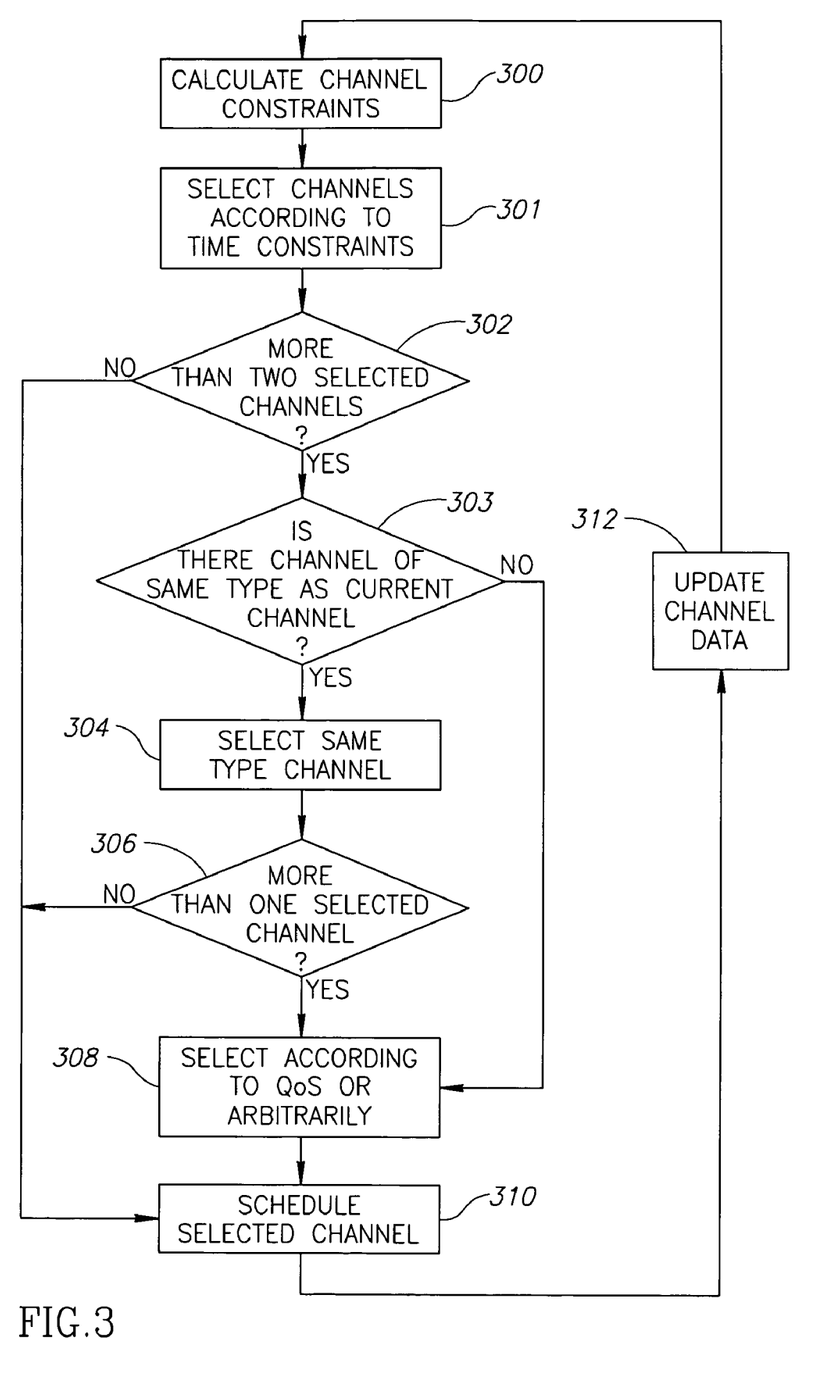
FIG. 3 is a flowchart of the actions performed by a scheduler, in accordance with an exemplary embodiment of the present invention.

FIG. 3 is a flowchart of acts performed by scheduler 30 in selecting a next channel for handling, in accordance with an exemplary embodiment of the invention. At each decision point of scheduler 30, the scheduler calculates (300) for each channel constraints of the channel that affect the timing of the channel. For example, calculating the time constraints may include calculating a time remaining until a deadline by which the channel must receive a processing session. In some embodiments of the invention, the remaining time until the deadline is calculated (300) as the time until the end of the respective cycle of the channel minus the estimated time 206 required to handle the channel. Naturally, if the calculated value is negative, the channel will suffer from starvation even if it is scheduled immediately. In such cases, the channel may be scheduled for a short session as mentioned below, in order to reduce the damage to the channel and/or to other channels.

Optionally, one or more channels are selected (301) according to the calculated time constraints. In some embodiments of the invention, the channel or channels with the shortest remaining time until their deadline are selected (301). If (302) a plurality of channels 202 have equal shortest remaining times, scheduler 30 optionally determines the type of channel currently being handled by processor 28 and determines if (303) there is a channel of the same type as the currently handled channel in the channels having shortest remaining times, scheduler 30 selects (304) for scheduling a channel of the same type as the determined type of the currently handled channel.

Optionally, if (306) there are several channels of the same type as the type of the channel currently being handled, among the channels having the shortest remaining time, one of the channels is selected randomly or a channel having a highest quality of service (QoS) ranking is selected (308) for processing (310). Similarly, if (303) no channel of the same type could be found, scheduler 30 selects (308) a channel according to the QoS ranking of the channels. After the scheduling, scheduler 30 optionally updates (312) the channel data in table 200, if necessary, and recalculates (300) the channel time constraints.

Alternatively to selecting (308) according to QoS ranking, scheduler 30 assigns an arbitrary order to each of the several channels such that the scheduler substantially always schedules the several channels in a same order. Alternatively or additionally, table 200 of scheduler 30 lists the most recent time in which each channel was handled. When a plurality of channels is otherwise with equal right for processing, the channel waiting for processing for the longest duration, precedes. Other methods of choosing between channels with equivalent characteristics may be used.

In some embodiments of the invention, internal memory 36 is sufficiently large to host a plurality of software modules. Optionally, when a plurality of channels have a shortest time remaining until the end of their cycle, a channel of a type whose software is currently in internal memory 36 is selected. The preference to channels having their software in internal memory 36 reduces the time spent on changing the contents of internal memory 36 and thus increases the number of channels which can be handled by processor 28. It is estimated that under normal conditions, selecting the next scheduled channel based partially on reducing memory swaps increases the number of channels handled by processor 28 by 30-40%.

Alternatively to using the QoS (308) only for selecting between channels having the same type, the selecting (308) based on QoS is performed before selecting (304) according to channel type. That is, only if two or more channels have the same QoS ranking is the type of the channel consulted.

In the above discussion, efficiency considerations are used as a tie breaker when the time constraints of a plurality of channels are equal. In some embodiments of the invention, however, as is now described in detail, efficiency considerations are used in a wider span of occasions. Optionally, at some or all scheduling determination points, scheduler 30 selects, based on timing constraints, X channels that can all be handled in any order up to the end of their cycles. The order of scheduling of the X channels is then determined according to efficiency considerations or other considerations.

Thus, in accordance with some embodiments, the selecting (301) according to time constraints includes selecting channels having different times until their deadlines, when possible, rather than selecting channels having a same (e.g., shortest) time until their deadline. Optionally, in each scheduling decision, scheduler 30 determines which channels can be handled next, without causing one of the channels having a closer deadline than the selected channel to suffer from starvation. In some embodiments of the invention, scheduler 30 determines the number (x) of channels that can be handled in the time remaining until the end of the cycle of the channel having the shortest remaining time until its deadline. Scheduler 30 then selects (301) the x channels having shortest times remaining to their deadlines.

Among these x channels, a channel having a same type as currently handled (or requiring a software module currently within internal memory 36) is selected (304) for scheduling next. If there are a plurality of channels having a same type, the channel with a shortest time remaining to the end of its cycle, is chosen. Alternatively, in such a case, the channel with the highest QoS ranking is selected (308).

In some embodiments of the invention, scheduler 30 selects channels to be processed a predetermined time before they are actually processed. For example, scheduler 30 may instruct a memory controller to load into internal memory 36, data relating to a channel which is going to be processed at a later time. Alternatively or additionally, scheduler 30 checks in advance for several channels that they will receive processing sessions on time. Optionally, if it is estimated that one or more of the channels will not receive a session on time, scheduler 30 assigns one of the channels to receive a limited processing session, for example as described in PCT Application No. PCT/IL00/00733, now PCT Publication No. WO 01/035228, in order to minimize the damage to the channel and/or to other channels.

In some embodiments of the invention, each time processor 28 processes a connection, it processes only a single input block of data samples, including data samples accumulated in a single cycle of the connection, even if more samples have been accumulated in the respective buffer 24. In addition, processor 28 generates only a single output block of samples which are placed in output buffer 34. Thus, the processing time required to process a connection is substantially constant, simplifying the estimation of the processing time required by each connection.

Optionally, the single input block comprises a block of samples accumulated during a previous cycle of the cycle scheme of the connection, and the output block of samples is transferred by driver 22 at about the end of the current cycle of the cycle scheme of the connection. Thus, the same data samples of the connection are processed by processor 28 regardless of the relative time in its cycle in which the processor is scheduled to handle the data of the connection. Alternatively, as described in above mentioned PCT Publication No. WO 01/60008, the input and/or output blocks comprise blocks of samples accumulated substantially immediately before the processing begins and exported by driver 22 substantially immediately after they are placed in output buffer 34. This reduces the delay between receiving data from channel 26 and transmitting a response thereto onto channel 26.

Optionally, the type of a channel and/or the quality of service rating of a channel may be changed during the operation of the channel. For example, a channel may respond with a voice answering machine and thereafter transfer to a fax transmission. In another example, a universal gateway may begin the handling of a channel in a voice mode and then move to a modem mode when the connection is identified as a modem connection.

In some embodiments of the invention, the software modules of different types of channels are created having mutual portions. Optionally, the memory locations of the mutual portions within internal memory 36 are chosen such that they are the same for the different software modules. When scheduler 30 changes between two software modules having a mutual portion, only some of the software needs to be replaced, thus reducing the time required for changing the software. Optionally, when (303) none of the channels which can be scheduled has its software already in internal memory 36, scheduler 30 selects a software module that only requires partial loading into the memory, if possible. Alternatively or additionally, scheduler 30 selects a channel having a relative small size, which allows the software module of the channel to be loaded into internal memory 36, without requiring removal of one or more software modules to be required shortly after the next scheduling.

In some embodiments of the invention, scheduler 30 determines, in advance, a scheduling scheme for a plurality of channels, taking into account which software modules can co-exist in memory 36.

It will be appreciated that the above described methods may be varied in many ways, including, changing the order of steps, and/or performing a plurality of steps concurrently. It should also be appreciated that the above described description of methods and apparatus are to be interpreted as including apparatus for carrying out the methods and methods of using the apparatus. The present invention has been described using non-limiting detailed descriptions of embodiments thereof that are provided by way of example and are not intended to limit the scope of the invention. Many specific implementation details may be used. For example, processor 28 may include a single core or may include a plurality of cores. In addition, the contents of the output data placed in output buffer 34 may depend on the contents of the data in input buffer 24 or the contents of the buffers may be unrelated.

It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art. Furthermore, the terms "comprise," "include," "have" and their conjugates, shall mean, when used in the claims, "including but not necessarily limited to."

It is noted that some of the above described embodiments may describe the best mode contemplated by the inventors and therefore may include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims.

The invention claimed is:

1. A method of scheduling the handling of communication channels by a processor assigned to handle a plurality of channels, comprising:
   determining for each channel of a plurality of assigned channels of the processor, handled by the processor, a target time by which time it should receive processing;
   selecting one or more of the assigned channels whose data is to be handled next, based on the target times of the channels; and
   when more than one channel is selected, choosing for handling before other channels, at least one of the selected channels based on a consideration directed at minimizing the average processing time of the channels,
   wherein determining a target time for each channel comprises determining an average duration of the handling of the channel, and
   wherein determining a target time for each channel comprises determining the target time as the time at which a driver collects processed data of the channel minus the average handling duration.

2. A method according to claim 1, wherein selecting based on the target times comprises selecting the channels having a shortest duration until their target times.

3. A method according to claim 1, wherein choosing at least one of the selected channels comprises choosing at least one channel of a same type as a channel currently handled by the processor.

4. A method according to claim 1, wherein choosing at least one of the selected channels comprises choosing from the selected channels that have an equal quality of service rating.

5. A method according to claim 1, wherein choosing at least one of the selected channels comprises choosing for handling all the selected channels before handling other channels.

6. A method according to claim 1, wherein selecting based on the target times comprises selecting a plurality of channels having different target times.

7. A method according to claim 1, wherein choosing at least one of the selected channels comprises choosing based on the protocol governing the handling of the data of the channels.

8. A method according to claim 1, wherein choosing at least one of the selected channels comprises choosing based on a consideration that minimizes time spent on memory transfers.

9. A method of scheduling the handling of communication channels by a processor assigned to handle a plurality of channels, comprising:
   determining for each channel of a plurality of assigned channels of the processor, handled by the processor, a target time by which time it should receive processing;
   selecting one or more of the assigned channels whose data is to be handled next, based on the target times of the channels; and
   when more than one channel is selected, choosing for handling before other channels, at least one of the selected channels based on a consideration directed at minimizing the average processing time of the channels,
   wherein selecting based on the target times comprises determining a closest target time among the target times of the channels and determining a number of channels which can be handled in the time remaining until the closest target time.

10. A method according to claim 9,
   wherein choosing at least one of the selected channels comprises choosing at least one channel of a same type as a channel currently handled by the processor.

11. A method according to claim 9, wherein determining a target time for each channel comprises determining a time by which the channel needs to receive a handling session in order to avoid starvation.

12. A method according to claim 9, wherein determining a target time for each channel comprises determining an average duration of the handling of the channel.

13. A method according to claim 9, wherein selecting based on the target times comprises selecting channels having the shortest time until their target times up to the determined number of channels.

14. A method according to claim 13, wherein choosing at least one of the selected channels comprises choosing based on the types of the channels.

15. A method according to claim 9, wherein choosing at least one of the selected channels comprises choosing at least one channel that requires processing by a software module already in a memory of the processor.

16. A method according to claim 9, wherein choosing at least one of the selected channels comprises choosing from all the selected channels based on the consideration directed at minimizing the average processing time of the channels.

17. A method according to claim 9, wherein choosing at least one of the selected channels comprises choosing based on the transmission rates of the channels.

18. A method according to claim 9, wherein selecting based on the target times comprises selecting a plurality of channels having different target times.

19. A method of scheduling the handling of communication channels by a processor assigned to handle a plurality of channels, comprising:
   determining for each channel, handled by the processor, a target time by which time it should receive processing;
   selecting, based on the target times of the channels, a plurality of assigned channels, having two or more different target times, from which a next handled channel is to be selected;
   choosing for processing one of the selected channels at least partially based on considerations not related to the target times of the channels; and
   scheduling the processor to handle the chosen channel,
   wherein choosing one of the selected channels comprises choosing a channel having a farther target time than at least one channel that was not chosen, and
   wherein selecting based on the target times comprises determining a number x of channels which can be handled in the time remaining until a closest target time of the assigned channels, and selecting the x channels having the shortest time until their target times.

20. A method according to claim 19, wherein choosing one of the selected channels comprises choosing from the selected channels a channel having a closer target time than at least one channel that was not chosen.

21. A method according to claim 19, wherein choosing one of the selected channels comprises selecting based on processing efficiency considerations.

22. A method according to claim 19, wherein determining a target time for each channel comprises determining a time by which the channel needs to receive a handling session in order to avoid starvation.

23. A method according to claim 22, wherein choosing one of the selected channels comprises choosing a channel that requires processing by a software module already in a memory of the processor.

24. A method according to claim 19, wherein choosing one of the selected channels comprises choosing a channel that requires processing by a software module already in a memory of the processor.

25. A method according to claim 19, wherein choosing one of the selected channels comprises choosing a channel of a same type as a channel currently handled by the processor.

26. A method according to claim 25,
   wherein choosing one of the selected channels comprises choosing from the selected channels a channel having a closer target time than at least one channel that was not chosen.

27. A method according to claim 26, wherein choosing one of the selected channels comprises choosing a channel having a farther target time than at least one channel that was not chosen.

28. A method according to claim 19, wherein choosing one of the selected channels comprises choosing a plurality of channels based on considerations not related to timing issues and choosing therefrom a single channel based on the target times.

29. A method of scheduling the handling of communication channels by a processor assigned to handle a plurality of channels, comprising:
   determining for each channel, handled by the processor, a target time by which time it should receive processing;
   selecting, based on the target times of the channels, a plurality of assigned channels, having two or more different target times, from which a next handled channel is to be selected;

choosing for processing one of the selected channels at least partially based on considerations not related to the target times of the channels; and scheduling the processor to handle the chosen channel, wherein selecting based on the target times comprises determining a number x of channels which can be handled in the time remaining until a closest target time of the assigned channels, and selecting the x channels having the shortest time until their target times.

30. A method according to claim 29, wherein choosing one of the selected channels comprises choosing a channel of a same type as a channel currently handled by the processor.

31. A method according to claim 29, wherein choosing one of the selected channels comprises choosing a channel that requires processing by a software module already in a memory of the processor.

* * * * *